(12) United States Patent
Wu et al.

(10) Patent No.: US 11,121,965 B2
(45) Date of Patent: Sep. 14, 2021

(54) NETWORK RESOURCE ISOLATION METHOD FOR CONTAINER NETWORK AND SYSTEM THEREOF

(71) Applicant: Huazhong University of Science and Technology, Hubei (CN)

(72) Inventors: Song Wu, Hubei (CN); Hai Jin, Hubei (CN); Junjian Guan, Hubei (CN)

(73) Assignee: Huazhong University of Science and Technology, Hubei (CN)

( * ) Notice: Subject to any disclaimer, the term of this patent is extended or adjusted under 35 U.S.C. 154(b) by 0 days.

(21) Appl. No.: 16/773,051

(22) Filed: Jan. 27, 2020

(65) Prior Publication Data

US 2020/0322263 A1 Oct. 8, 2020

(30) Foreign Application Priority Data

Apr. 4, 2019 (CN) .......................... 201910274987.9

(51) Int. Cl.
| | |
|---|---|
| *H04L 12/28* | (2006.01) |
| *H04L 12/725* | (2013.01) |
| *H04L 12/721* | (2013.01) |
| *H04L 12/913* | (2013.01) |
| *H04L 12/911* | (2013.01) |
| *H04L 12/923* | (2013.01) |

(52) U.S. Cl.
CPC .......... *H04L 45/3065* (2013.01); *H04L 45/34* (2013.01); *H04L 47/724* (2013.01); *H04L 47/745* (2013.01); *H04L 47/762* (2013.01); *H04L 47/828* (2013.01)

(58) Field of Classification Search
None
See application file for complete search history.

(56) References Cited

U.S. PATENT DOCUMENTS

| | | | | |
|---|---|---|---|---|
| 2007/0028291 | A1* | 2/2007 | Brennan | H04L 63/20 726/1 |
| 2009/0322510 | A1* | 12/2009 | Berger | G06Q 10/0833 340/539.1 |
| 2017/0163502 | A1* | 6/2017 | MacNeil | H04L 43/045 |
| 2017/0322934 | A1* | 11/2017 | Chen | G06F 8/71 |
| 2018/0270165 | A1* | 9/2018 | Chen | G06F 9/5072 |
| 2019/0007280 | A1* | 1/2019 | Sarangam | H04L 41/5003 |
| 2019/0028435 | A1* | 1/2019 | Khare | H04L 63/0236 |
| 2020/0012443 | A1* | 1/2020 | Chen | G06F 3/0629 |
| 2020/0050576 | A1* | 2/2020 | Rangachari | H04L 45/566 |
| 2020/0053026 | A1* | 2/2020 | Rangachari | H04L 45/306 |

* cited by examiner

*Primary Examiner* — Elisabeth Benoit Magloire (74) *Attorney, Agent, or Firm* — Michael X. Ye; Morris, Manning & Martin, LLP (57) ABSTRACT

A network resource isolation method for container networks and a system thereof, including a computation system for network resource isolation, or a system using network resource isolation, or a network resource isolation system for container networks, and methods of implementation thereof. The system provides container overlay networks with a resource isolation scheme that also reduces the use threshold for isolation of network resources and optimizes the utilization rate of network resources.

8 Claims, 2 Drawing Sheets

NETWORK RESOURCE ISOLATION METHOD FOR CONTAINER NETWORK AND SYSTEM THEREOF

FIELD

The present invention relates to computer application systems, and more particularly to a network resource isolation method for container networks and a system implementing the method.

DESCRIPTION OF RELATED ART

As a featherweight virtualization solution, containers have been extensively deployed for cloud datacenters and contribute significantly to improved performance and reduced costs. As compared to traditional virtual machine technology, the container-based solution achieves higher efficiency and fewer resources by using namespaces that share the operation system kernel of a host but not providing each application with a dedicated operation system. However, as a featherweight version of virtual machines, the container-based solution only provides application-level abstract, and is not robust enough in terms of hardware isolation and complex resource management. Resource demands of containers depend on the type and amount of containers. When multiple containers run on the same host and share the same operating system kernel, competition for resources is always unavoidable and seriously undermines system performance.

To address this issue, Docker has been implemented as a dominant container-based solution, wherein the control group CGroup from Linux provides containers with isolation and allocation of CPU, memory and disk resources. Unfortunately, the existing container frameworks do not attend the network resources required by the hundreds, thousands and even more containers in a host to execute internal and external communications at all. Therefore, it is critical to provide a solid solution for resource isolation and traffic control for container networks.

In order to realize featherweight network isolation and traffic control, traffic control modules provide by Linux systems are ideal choices. A traffic control module is also referred to as Traffic Control, or TC in short. In virtue to its featherweight nature and great scalability, TC has been extensively used in virtualized environments and network traffic control applications. Some studies also reveal the possibility and advantages of introducing TC into container systems. However, there are three reasons prevent TC from directly being used for container network resource isolation and traffic control. First, containers run in various network modes for different workloads, such as overlay networks and non-overlay networks. An overlay network is a network running in another network and building virtual connection between nodes. In other words, an overlay network may refer to an abstract network set and operating on an underlying network. An underlying network may include plural physical network nodes that are connected to each other. Such an overlay network may include one or more virtual networks. A virtual network usually refers to abstract on a part of an underlying network in an overlay network. Such a virtual network may include one or more virtual terminals that are referred to as tenant sites. Such a virtual terminal is independently used by a user or a tenant to access a virtual network and the related computation, storage or other suitable resources. An overlay network may refer to a network wherein container data packets are packeted by VXLAN and UDP headers of a host, and IPs of the container data packets are invisible to the host. A non-overlay network may refer to a network wherein container data packets are transferred to a host without being packeted, and IP's of the container data packet are visible to the host. Overlay networks commonly used include: Docker native overlay networks, Flannel and Weave, and non-overlay networks include NAT and Calico. A container data packet using an overlay network is packeted by XVLAN and UDP headers of a host, causing its container IP to be hidden. VXLAN means Virtual Extensible LAN. This network virtualization technology is based on IP networks and is an L2 VPN technology using the format of "MAC in UDP" for packeting. UDP stands for User Datagram Protocol. TC is incompetent in container environments using overlay networks because both of filters that used by TC to identify data packets, namely Classid Filter and IP Filter, are unable to follow container data packets in multiple network modes. From the perspective of Classid Filter. Classid is data packet information specific to a network namespace. This means that Classid Filter is not designed for containers because container data packets have to move across network namespaces and this causes loss of Classid. IP Filter needs container IPs for it to follow data packets. Unfortunately, it is known that an overlay network hides container IPs. This means that IP Filter can only work normally in non-overlay networks. Put differently, TC cannot provide a universal solution for network isolation and traffic control, and is unable to manage containers in multiple network modes. Second, TC is relatively complicated in terms of operation and configuration, and its use requires full understanding traffic control to detail. Thus, it burdens container users with additional learning on TC operation and configuration. Third, TC is focused on static network isolation and traffic control. Put differently, once TC command is executed, it is impossible to make changes in container organization and in resource configuration. Therefore, when a new container is launched, adjustment of the resource allocation for existing containers according to global consideration for resource demands and service quality becomes impossible. Similarly, when a launched container is deactivated, the resources released from it cannot be reallocated to other containers for full use of resources. This is particularly disadvantageous given that containers have short lifecycles and diverse uses. In other words, every server may host hundreds or thousands of launched containers that are subject to frequent activation and deactivation. The known TC resource allocation algorithms incompetent at the high dynamics in container environments, and tends to lead to degraded performance. There is a lack for solutions to network resource isolation in container environments that answer all network modes and fits to container characteristics, and a lack for a solution to effective isolation for container overlay networks is particularly needed.

SUMMARY OF THE INVENTION

In view of the shortcomings of the prior art, the present invention provides a network resource isolation method for container networks and a system thereof. The disclosed isolation scheme is suitable for all container network modes and fit in with container characteristics. Based on TC, the disclosed scheme solves problems of TC in container environments about incompetence in container overlay networks, configuration complexity and statics related to isolation organization and resource configuration. The present invention provides container overlay networks with a resource isolation scheme that also reduces the use threshold for isolation of network resources and optimizes the utilization rate of network resources.

According to one preferred embodiment, a computation system comprises a plurality of processors; a plurality of memories; and a plurality of commands, being stored in the at least one memory and executable on the at least one processor so as to perform an operation; wherein, the operation comprises: before a relevant container sends out a data packet, attaching an exclusive container network identity of the container to the data packet without losing source container information of the data packet even in an overlay network mode; identifying a source container of the data packet according to the container network identity attached to the data packet in both the overlay network mode and a non-overlay network mode and classifying the data packet into a class and a queue discipline of the source container; and monitoring an operational state of the container on a host and dynamically adjusting a part or all of network resources isolated by the container when the operational state of the container at least partially changes.

According to one preferred embodiment, wherein the step of before the relevant container sends out the data packet, attaching the exclusive container network identity of the container to the data packet without losing source container information of the data packet even in the overlay network mode is achieved by attaching the exclusive container network identity of the container to a control information struct of the data packet.

According to one preferred embodiment, wherein the network resources include at least one of bandwidth resources, latency resources and priority resources.

According to one preferred embodiment, wherein monitoring the operational state of the container on the host and dynamically adjusting a part or all of network resources isolated by the container when the operational state of the container at least partially changes, the system further comprises: where any newly launched container on the host is detected, assigning an exclusive container network identity to each said newly launched container, creating the class and the queue discipline for each said newly launched container wherein the class and the queue discipline are used to isolate the network resources of the container, analyzing a startup parameter of each said newly launched container so as to convert the startup parameter into a traffic control command, and configuring the isolated network resources to the class and the queue discipline for the relevant newly launched container according to the relevant traffic control command.

According to one preferred embodiment, wherein monitoring the operational state of the container on the host and dynamically adjusting a part or all of network resources isolated by the container when the operational state of the container at least partially changes, the system further comprises: before the isolated network resources are configured to the class and the queue discipline for the relevant newly launched container according to a relevant traffic control command, identifying the network resources of the host that are available for allocation; where the network resources of the host that are available for allocation are sufficient to satisfy a demand of the relevant newly launched container for the network resources, allocating at least a part of the network resources available for allocation to the relevant newly launched container, and where the network resources of the host that are available for allocation are not sufficient to satisfy a demand of the relevant newly launched container for the network resources, dynamically adjusting a part or all of the network resources allocated to containers that have been allocated with network resources on the host so as to satisfy demands of relevant newly launched containers for network resources.

According to one preferred embodiment, wherein monitoring the operational state of the container on the host and dynamically adjusting a part or all of network resources isolated by the container when the operational state of the container at least partially changes, the system further comprises where any container stopping operation is detected on the host, releasing the network resources occupied by the container that stops, deleting the class and the queue discipline for the container that stops, and releasing the exclusive container network identity assigned to the container that stops.

According to one preferred embodiment, wherein the system further comprises: managing the container network identity used by the container that is capable of network resource isolation and is active on the host; recording a state of the relevant container network identity using a bitmap; when the relevant newly launched container needs to apply for a container network identity, searching for a minimal available container network identity from a low-order address in the bitmap and assigning it to the relevant newly launched container; and when the active container stops, changing a state of the container network identity assigned to the container that stops to "available".

According to one preferred embodiment, wherein the system further comprises receiving a request for setting a plurality of containers in the host as specific containers; setting the corresponding containers on the host as the specific containers in response to the request; and where the network resources available for allocation on the host are not sufficient to satisfy the demand of the relevant newly launched container for network resources, not adjusting the network resources allocated to the specific container, but selecting at least a part of containers that are not set as specific container and dynamically adjusting the network resources of at least a part of the containers that are selected so as to satisfy the demand of the relevant newly launched container for network resources.

According to one preferred embodiment, wherein a network resource isolation method for container networks, the method comprises: before a relevant container sends out a data packet, attaching an exclusive container network identity of the container to the data packet without losing source container information of the data packet even in an overlay network mode; identifying a source container of the data packet according to the container network identity attached to the data packet in both the overlay network mode and a non-overlay network mode and classifying the data packet into a class and a queue discipline of the source container; and monitoring an operational state of the container on a host and dynamically adjusting a part or all of network resources isolated by the container when the operational state of the container at least partially changes.

According to one preferred embodiment, wherein the step of before the relevant container sends out the data packet, attaching the exclusive container network identity of the container to the data packet without losing source container information of the data packet even in the overlay network mode is achieved by attaching the exclusive container network identity of the container to a control information struct of the data packet.

The present invention provides a network resource isolation method for container networks and a system thereof, which at least have the following advantages:

(1) solving problems about incompetence at resource isolation in overlay networks: the present invention attaches exclusive container network identity of a container to a data packet without losing source container information of the data packet even when the data packet is in the overlay network mode, thereby not only enabling identification of container data packets in a non-overlay network, but also enabling identification of container data packets in an overlay network.

(2) mitigating problems about complexity seen in the prior art: the present invention reduce complexity in use of container network resource isolation and traffic control by performing network resource isolation as demanded according to a startup parameter of the container, converting it into a network traffic control command, and at last implementing it in the class and the queue discipline for the container that performs network resources control.

(3) addressing problems about statics seen in the prior art: the present invention adjusts network resources according to the running state of the container, there by dynamically manage network resource isolation and optimizing the utilization rate of network resources.

DETAILED DESCRIPTION OF THE INVENTION

Detailed description will be given below with reference to the drawings.

Some terms used in this document have the definitions given below.

The overlay network mode may refer to a network mod wherein data packet IPs of containers are invisible to the host because data packets sent out by containers in an overlay network are packeted by the host holding the containers using XVLAN and UDP headers.

The non-overlay network mode may refer to a network mode wherein data packet IPs of containers are visible to the host because data packets sent out by containers in a non-overlay network are not container packeted by the host holding the containers using XVLAN and UDP headers and the data packets are forwarded to the host in their original form.

A class of containers may refer to a control strategy. Data packets of different containers are placed into different classes and each class represents a control strategy.

A queue discipline may refer to a rule for queuing. A queue discipline may be used to control speed of reception and transmission in networks. With queues, Linux can cache network data packets and then smooth network flow according to user settings without interruption of connection as much as possible (e.g. TCP).

A control information struct may refer to as sk_buff, or a socket buffer. A struct is an important data structure for Linux network codes, and is responsible for managing and controlling reception and transmission of information on data packets.

A traffic control command may refer to a Linux shell command-line command that generates information on traffic control configuration, such as "tc qdisc add dev . . . ", "tc class add dev . . . " etc.

A bitmap may refer to a data structure. Every bit in a bitmap has one of two values for indicating its certain state. For example, 1 may represent "used", while "0" may represent "unused".

Embodiment 1

The present embodiment discloses a computation system, or a system using network resource isolation, or a network resource isolation system for container networks. The disclosed system is suitable for executing every step of a method recited in the present invention, so as to achieve the expected technical effects. Without causing conflicts or incompatibility, a part and/or all the contents of preferred modes in other embodiments may be used as a supplementary to the present embodiment. The system may be one of a general-purpose computer, a server and a server cluster.

Figure 2:
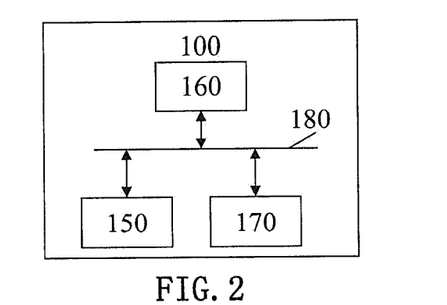
FIG. 2 is a hardware diagram of a system according to a preferred mode of the present invention.

According to one preferred embodiment, a computation system comprises a plurality of processors; a plurality of memories; and/or a plurality of commands, being stored in the at least one memory and executable on the at least one processor so as to perform an operation; wherein, the operation comprises: before a relevant container 300 sends out a data packet 310, attaching an exclusive container network identity 320 of the container to the data packet 310 without losing source container 300 information of the data packet 310 even in an overlay network mode; identifying a source container 300 of the data packet 310 according to the container network identity 320 attached to the data packet 310 in both the overlay network mode and a non-overlay network mode and classifying the data packet 310 into a class 410 and a queue discipline 420 of the source container 300; and/or monitoring an operational state of the container 300 on a host and dynamically adjusting a part or all of network resources isolated by the container 300 when the operational state of the container 300 at least partially changes. Referring to FIG. 2, the system may be setup on a host 100. The system comprises a processor 160, a host network card 150 and a memory 170. The processor 160 may be connected to the host network card 150 and the memory 170. The processor 160 may be connected to the host network card 150 through a bus 180. The processor 160 may be connected to the memory 170 through the bus 180.

According to one preferred embodiment, wherein the step of before the relevant container 300 sends out the data packet 310, attaching the exclusive container network identity 320 of the container 300 to the data packet 310 without losing source container information of the data packet 310 even in the overlay network mode is achieved by attaching the exclusive container network identity 320 of the container 300 to a control information struct of the data packet 310. With the foregoing configuration, the present invention is able to accomplish at least the following beneficial technical effects. First, source container information can be secured from loss in overlay networks because an overlay network packets data in the buffer areas of a data packet 310 and has no impact on the identity information stored in the control information struct so that when the data packet 310 arrives at the host, a filter 120 in the host classifies the data packet according to the container network identity 320. Second, source container information can be secured from loss in non-overlay networks. The new container network identity not only eliminates incompetence of TC in overlay networks, but also preserves competency of TC in non-overlay networks.

According to one preferred embodiment, wherein the network resources include at least one of bandwidth resources, latency resources and priority resources.

According to one preferred embodiment, wherein monitoring the operational state of the container 300 on the host 100 and dynamically adjusting a part or all of network resources isolated by the container 300 when the operational state of the container 300 at least partially changes, the system further comprises: where any newly launched container 300 on the host 100 is detected, assigning an exclusive container network identity 320 to each said newly launched container 300, creating the class 410 and the queue discipline 420 for each said newly launched container 300 wherein the class 410 and the queue discipline 420 are used to isolate the network resources of the container 300, analyzing a startup parameter of each said newly launched container 300 so as to convert the startup parameter into a traffic control command, and/or configuring the isolated network resources to the class 410 and the queue discipline 420 for the relevant newly launched container 300 according to the relevant traffic control command. With the foregoing configuration, the present invention is able to accomplish at least the following beneficial technical effects. First, resource configuration is automated and unburdens users because users can simply use the system that directly sets up organizational structure for network isolation without learning about details of traffic control. Second, resource configuration is simplified so that users can obtain resource assurance by describing resource demands without knowing the meaning of traffic control commands.

According to one preferred embodiment, wherein monitoring the operational state of the container 300 on the host 100 and dynamically adjusting a part or all of network resources isolated by the container 300 when the operational state of the container 300 at least partially changes, the system further comprises: before the isolated network resources are configured to the class 410 and the queue discipline 420 for the relevant newly launched container 300 according to a relevant traffic control command, identifying the network resources of the host 100 that are available for allocation; where the network resources of the host 100 that are available for allocation are sufficient to satisfy a demand of the relevant newly launched container 300 for the network resources, allocating at least a part of the network resources available for allocation to the relevant newly launched container 300, and/or where the network resources of the host 100 that are available for allocation are not sufficient to satisfy a demand of the relevant newly launched container 300 for the network resources, dynamically adjusting a part or all of the network resources allocated to containers 300 that have been allocated with network resources on the host 100 so as to satisfy demands of relevant newly launched containers 300 for network resources. Preferably, the network resources available for allocation may refer to idle network resources or unallocated network resources. With the foregoing configuration, the present invention is able to accomplish at least the following beneficial technical effects. First, weight-based allocation of resources is achieved by portioning resources more reasonably according to container weights. Second, dynamic allocation of resources is enabled, and the utilization rate of network resources is enhanced as compared to static resource allocation.

According to one preferred embodiment, wherein monitoring the operational state of the container 300 on the host 100 and dynamically adjusting a part or all of network resources isolated by the container 300 when the operational state of the container 300 at least partially changes, the system further comprises where any container 300 stopping operation is detected on the host 100, releasing the network resources occupied by the container 300 that stops, deleting the class 410 and the queue discipline 420 for the container 300 that stops, and/or releasing the exclusive container network identity 320 assigned to the container 300 that stops. With the foregoing configuration, the present invention is able to accomplish at least the following beneficial technical effects. First, resource configuration is automated and unburdens users because users can simply use the system that directly deletes organizational structure for network isolation and releases resources previously occupied. Second, the released resources can be reused by other containers, thereby enhancing the utilization rate of network resources.

According to one preferred embodiment, wherein the system further comprises: managing the container network identity 320 used by the container 300 that is capable of network resource isolation and is active on the host 100; recording a state of the relevant container network identity 320 using a bitmap; when the relevant newly launched container 300 needs to apply for a container network identity 320, searching for a minimal available container network identity 320 from a low-order address in the bitmap and assigning it to the relevant newly launched container 300; and/or when the active container 300 stops, changing a state of the container network identity 320 assigned to the container 300 that stops to "available". With the foregoing configuration, the present invention is able to accomplish at least the beneficial technical effect of ensuring highly accurate claiming and releasing operations by using a bitmap for recording purposes.

According to one preferred embodiment, wherein the system further comprises receiving a request for setting a plurality of containers 300 in the host 100 as specific containers; setting the corresponding containers 300 on the host 100 as the specific containers 300 in response to the request; and/or where the network resources available for allocation on the host 100 are not sufficient to satisfy the demand of the relevant newly launched container 300 for network resources, not adjusting the network resources allocated to the specific container 300, but selecting at least a part of containers 300 that are not set as specific container 300 and dynamically adjusting the network resources of at least a part of the containers 300 that are selected so as to satisfy the demand of the relevant newly launched container 300 for network resources. Preferably, the request may be input to the host 100 by a user using an input device. With the foregoing configuration, the present invention is able to accomplish at least the beneficial technical effect described below. The present invention allows key containers 300 to be set as specific containers 300, whose demands for network resources are always satisfied so as to prevent these containers 300 from resource deficiency caused by the system expropriation in resources when the overall network resources are insufficient.

Embodiment 2

The present embodiment provides further improvements to Embodiment 1, and what is identical to its counterpart in the previous embodiment will not be repeated in the following description.

Figure 1:
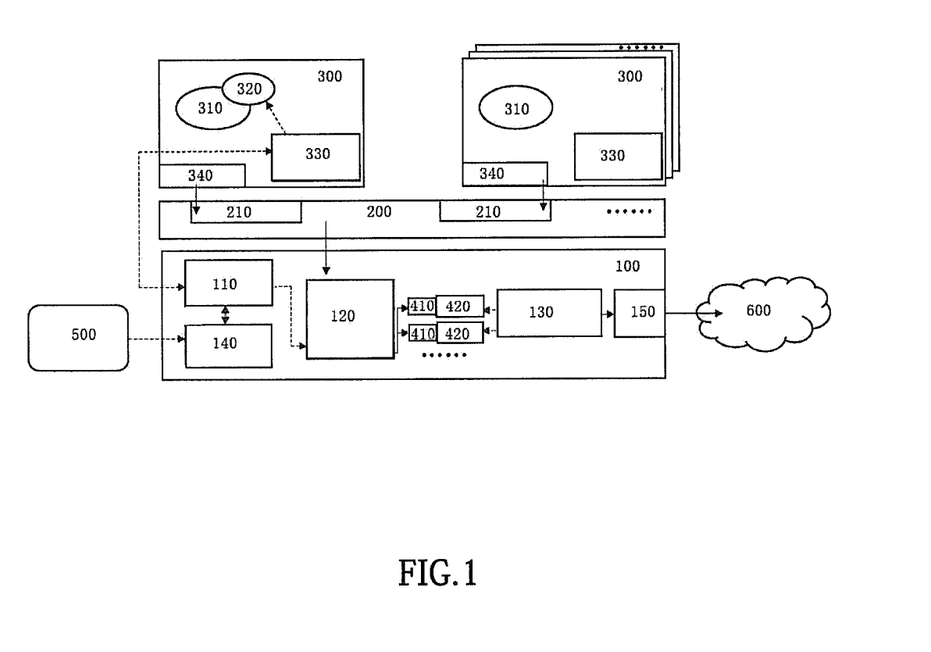
FIG. 1 is a modular diagram of a system according to a preferred mode of the present invention.

According to one preferred embodiment, referring to FIG. 1, the system may comprise at least one of an identity execution module 330, an identity management module 110, an identification module 120, a resource module 130 and a dynamic adjustment module 140. Preferably, the identity execution module 330 may be connected to the identity management module 110. The identity management module 110 may be connected to the dynamic adjustment module 140. The identity management module 110 may be connected to the identification module 120. The dynamic adjustment module 140 may be connected to a Docker Daemon 500. The identification module 120 may be connected to the resource module 130. The resource module 130 may be connected to the network card 150 of the host 100. The host 100 may be connected to the internet 600 through the network card 150 of the host 100. The container 300 comprises a network card 340. The overlay network 200 comprises an overlay network interface card 210. Also included is a network card 340 of the container 300 connected to the overlay network interface card 210. A data packet 310 may transmitted to the host 100 through the network card 340 of the container 300 and the overlay network interface card 210.

According to one preferred embodiment, at least one of the identity execution module 330, the identity management module 110, the identification module 120, the resource module 130 and the dynamic adjustment module 140 may be stored in at least one memory in the form of at least one command.

According to one preferred embodiment, identity execution module 330 may run inside the container 300. The identity execution module 330 may be used to capture data packets 310 of the container 300 and attach a container network identity 320 exclusive to that container 300 to each of the captured data packets 310. The container network identity 320 attached to the data packet 310 can prevent information on the source container 300 of the data packet 310 from loss in an overlay network 200. Preferably, the identity execution module 330 may be used in a container 300 that has capability of resource isolation and is running. When the container 300 needs to send out a network data packet 310, the identity execution module 330 captures the data packet 310, and attaches the container network identity 320 from the identity management module 110 to the data packet 310. The attached container network identity 320 will later be identified in a way different from the known approaches. Particularly, the attached container network identity 320 is regarded as a member of the control information struct for the data packet 310. In other words, the attached container network identity 320 is attached to the control information struct of the data packet 310. Use of such an identity is advantageous because container network identity 320 is not packeted by the overlay network 200, thereby preventing incompetent resource isolation.

According to one preferred embodiment, the identity management module 110 may run in the host 100. The identity management module 110 may be used to manage identities of data packets 310 owned by containers 300 running on the host 100. When a newly launched container 300 needs network resource isolation, it may apply to the identity management module 110 for an exclusive container network identity 320 and assign the identity to the newly launched container 300. When a running container 300 stops running, it returns its container network identity 320 to the identity management module 110. Preferably, the identity management module 110 may be used to manage the container network identity 320 used by the container 300 running in the host 100 that is capable of network resource isolation. The identity management module 110 may use a bitmap to record the state of some certain container network identity 320. When a newly launched container 300 needs a container network identity 320, the identity management module 110 may search for the minimal available container network identity 320 in the bitmap from a low-order address. When a running container 300 stops, it may send a signal for releasing the container network identity 320 to the identity management module 110. The identity management module 110 may use a bit operation to change the state of the container network identity 320 to "available".

According to one preferred embodiment, the identification module 120 may runs in a host 100. The identification module 120 may be used to identify data packets 310 coming from different containers 300. After data packets 310 from different containers 300 arrive at the host 100, the identification module 120 may classify the data packets 310 to different classes and queue disciplines 420 according to their network identities. Preferably, the identification module 120 may be used to identify sources of data packets 310 in different network modes of the containers 300. The different network modes of containers 300 may comprise an overlay network 200 and a non-overlay network 200. When a data packet 310 arrives at the network stack of the host 100, the identification module 120 may capture the data packet 310 and acquire the container network identity 320 attached to the control information struct of the data packet 310. The identification module 120 may figure out the class 410 and the queue discipline 420 of the container 300 to which the data packet 310 belongs according to the container network identity 320, and may put the data packet 310 in the corresponding queue discipline 420 for dispatch.

According to one preferred embodiment, resource module 130 may run in a host 100. The resource module 130 may be used to provide containers 300 with resource assurance. The resources assurance may comprise bandwidth assurance, latency assurance and priority assurance. The bandwidth assurance may be used to provide containers 300 with the minimal available bandwidth. The latency assurance may be used to provide containers 300 with the maximum latency for dispatch of data packets 310. The priority assurance may be used to set the order for containers 300 to obtain idle bandwidths when the host 100 has idle bandwidths. The resource module 130 may be used to analyze a startup parameter of the container 300 and to convert it into a network traffic control command. When a new container 300 is launched, the startup parameter may be sent to the system or the host 100. The resource module 130 may analyze the startup parameter and convert it to the available minimal bandwidth, the maximum latency and the priority for obtaining the idle bandwidth of the container 300, and attach the information to the class to which the container 300 belongs as a basis for the order of dispatching data packets 310 that queue following the queue discipline 420. Preferably, the resource module 130 may analyze the startup parameter and convert it to a traffic control command. The resource module 130 may attach the traffic control command to the class 410 of the container 300 or the class to which the container 300 belongs as a basis for the order of dispatching data packets 310 that queue following the queue discipline 420. Preferably, the traffic control command may comprise at least one command for setting the available minimal bandwidth, the maximum latency and the priority for obtaining the idle bandwidth of the container 300.

According to one preferred embodiment, dynamic adjustment module 140 may run in a host 100. The dynamic adjustment module 140 may be used to adjust organization of network resource isolation and adjust network resource configuration according to changes in the state of the container 300 or the running state of the container 300. The organizational adjustment of network resource isolation may be used to adjust the class and the queue discipline 420 for components that restrict the network resources of the container 300 according to changes in the state of the container 300. The adjustment of network resource configuration may be used to adjust the minimal bandwidth, the maximum latency and the priority for obtaining the idle bandwidth of the container 300 of every container 300 according to changes in the state of the container 300. Preferably, the dynamic adjustment module 140 may be used to adjust the organization of network resource isolation and resource configuration according to changes in the state of the container 300. The organization of network resource isolation may refer to the class and the queue discipline 420 to which the container 300 belongs. Preferably, in the present invention, a class to which a container 300 belongs may refer to the class 410 of the container 300. When a container 300 needing network resource isolation is launched, the dynamic adjustment module 140 creates its class and queue discipline 420. When a running container 300 stops running, the dynamic adjustment module 140 deletes the relevant class and queue discipline 420. The resource configuration refers to bandwidth, latency and priority resources. When a container 300 needing network resource isolation is launched, the dynamic adjustment module 140 configures the resources it requires to the class. Where the required resources need to be provided by other containers 300, resource configuration of classes of other containers 300. When a running container 300 stops, the dynamic adjustment module 140 may release the network resources owned by the container 300 and allocate them to other running containers 300.

Embodiment 3

The present embodiment provides further improvements to Embodiment 1, and what is identical to its counterpart in the previous embodiment will not be repeated in the following description. Without causing conflicts or incompatibility, a part and/or all the contents of preferred modes in other embodiments may be used as a supplementary to the present embodiment.

The present embodiment discloses an isolation method, or a method using network resource isolation, or a network resource isolation method for container networks. The disclosed method is suitable for executing every step of a system and/or other alternative parts recited in the present invention, so as to achieve the expected technical effects. Without causing conflicts or incompatibility, a part and/or all the contents of preferred modes in other embodiments may be used as a supplementary to the present embodiment. For example, all the contents of description in Embodiment 1 is used as a supplementary to the present embodiment.

According to one preferred embodiment, wherein a network resource isolation method for container networks, comprising: before a relevant container 300 sends out a data packet 310, attaching an exclusive container network identity 320 of the container 300 to the data packet 310 without losing source container information of the data packet 310 even in an overlay network mode; identifying a source container 300 of the data packet 310 according to the container network identity 320 attached to the data packet 310 in both the overlay network mode and a non-overlay network mode and classifying the data packet 310 into a class 410 and a queue discipline 420 of the source container 300; and/or monitoring an operational state of the container 300 on a host 100 and dynamically adjusting a part or all of network resources isolated by the container 300 when the operational state of the container 300 at least partially changes.

Figure 3:
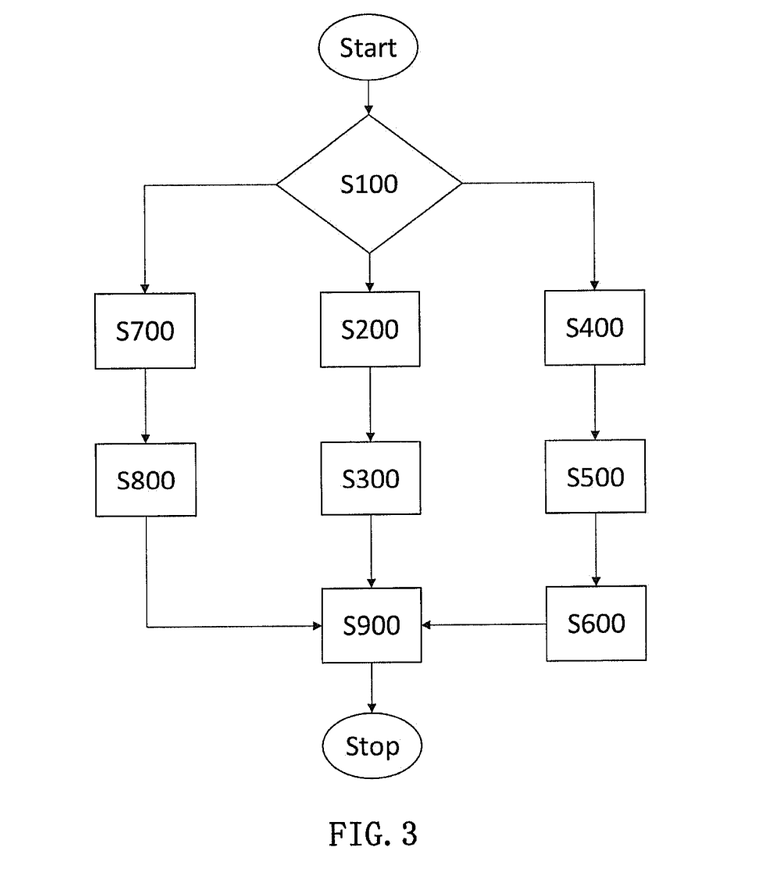
FIG. 3 is a flowchart of a method according to a preferred mode of the present invention.

According to one preferred embodiment, referring to FIG. 3, the method comprises the following steps:

At S100, it is first determined whether the container 300 is to be launched, activated or deactivated. If the container 300 is to be launched, the process proceeds with S200. If the container 300 is running, the process proceeds with S400, if the container 300 is deactivated, the process proceeds with S700.

At S200, the dynamic adjustment module 140 applies to identity management module 110 for the exclusive container network identity 320 for the newly launched container 300, and creates the class and the queue discipline 420 used for isolation of network resources of the container 300. Then the process proceeds with S300.

At S300, a startup parameter for the container 300 is analyzed and the startup parameter is converted into a traffic control command. The system configures the bandwidth, latency and priority resources to the class and the queue discipline 420. Then the process proceeds with S900.

At S400, the container 300 is running and sends out the data packet 310. The identity execution module 330 identifies the data packet 310 according to the container network identity 320 of the container 300, and the data packet 310 leaves the container 300 for the host 100. Then the process proceeds with S500.

At S500, the data packet 310 arrives at the overlay network 200 of the container 300, and is packeted by the overlay network 200. Then the process proceeds with S600.

At S600, the data packet 310 passes through the overlay network 200 and arrives at the network stack of the host 100. The identification module 120 acquires the network identity of the source container 300 and classifies the data packet 310 to the class to which the container 300 belongs for the data packet 310 to wait in the queue discipline 420 for dispatch. Then the process proceeds with step S900.

At S700, the dynamically control module releases the bandwidth, latency and priority resources previously occupied by the container 300 that stops running. Then the process proceeds with step S800.

At S800, the dynamic adjustment module 140 deletes the class 410 and the queue discipline 420 of the container 300, and releases the container network identity 320 to the identity management module 110. Then the process proceeds with step S900.

At S900, The current operation ends.

According to one preferred embodiment, referring to S200 and S700, the system may automatically adjust the isolation resources of the container 300 using the dynamic adjustment module 140 according to changes in the state of the container 300.

According to one preferred embodiment, referring to S300, the system may make resource isolation simple and easy to use by converting the startup parameter of the container 300 in to a command about network traffic control.

According to one preferred embodiment, referring to S600, the present invention solves incompetence of network traffic control and resource isolation in an overlay network 200 by identifying the source container 300 of the data packet 310 in the overlay network 200.

A word "module" as described in the description refers to a hardware, a software or any combination of a hardware and a software which can execute the function related to "module".

It should be noted that the above specific embodiments are exemplary, persons skilled in the art can devise various solutions under the inspiration of the disclosed content of the present invention, and the solutions also belong to the disclosed scope of the present invention and fall into the protection scope of the present invention. Persons skilled in the art shall understand that the specification and its drawings of the present invention are exemplary and do not limit the claims. The protection scope of the present invention is limited by the claims and its equivalents.

What is claimed is:

1. A computation system, wherein the system comprises:
   at least one processor; and
   at least one memory, wherein at least one command is stored in the at least one memory and executable on the at least one processor to perform an operation;
   wherein, the operation comprises:
   before a relevant container sends out a data packet, attaching an exclusive container network identity of the container to the data packet without losing source container information of the data packet in an overlay network mode;
   identifying a source container of the data packet according to the container network identity attached to the data packet in both the overlay network mode and a non-overlay network mode and classifying the data packet into a class and a queue discipline of the source container;
   monitoring an operational state of the container on a host and dynamically adjusting a part or all of network resources isolated by the container when the operational state of the container at least partially changes, including:
      where any newly launched container on the host is detected, assigning an exclusive network identity to each said newly launched container,
      creating the class and the queue discipline for each said newly launched container wherein the class and the queue discipline are used to isolate the network resources of the container,
      analyzing a startup parameter of each said newly launched container to convert the startup parameter into a traffic control command, and
      configuring the isolated network resources to the class and the queue discipline for the relevant newly launched container according to the relevant traffic control command;
   managing the container network identity used by the container that is configured to network resource isolation and is active on the host;
   recording a state of the relevant container network identity using a bitmap;
   when the relevant newly launched container needs to apply for a container network identity, searching for a minimal available container network identity from a low-order address in the bitmap and assigning it to the relevant newly launched container; and
   when the active container stops, changing a state of the container network identity assigned to the container that stops to "available".

2. The computation system of claim 1, wherein before the relevant container sends out the data packet, attaching the exclusive container network identity of the container to the data packet without losing source container information of the data packet in the overlay network mode is achieved by attaching the exclusive container network identity of the container to a control information struct of the data packet.

3. The computation system of claim 2, wherein the network resources include at least one of bandwidth resources, latency resources and priority resources.

4. The computation system of claim 3, wherein the step of monitoring the operational state of the container on the host and dynamically adjusting a part or all of network resources isolated by the container when the operational state of the container at least partially changes comprises:
   before the isolated network resources are configured to the class and the queue discipline for the relevant newly launched container according to a relevant traffic control command, identifying the network resources of the host that are available for allocation,
   where the network resources of the host that are available for allocation are sufficient to satisfy a demand of the relevant newly launched container for the network resources, allocating at least a part of the network resources available for allocation to the relevant newly launched container, and
   where the network resources of the host that are available for allocation are not sufficient to satisfy a demand of the relevant newly launched container for the network resources, dynamically adjusting a part or all of the network resources allocated to containers that have been allocated with network resources on the host to satisfy demands of relevant newly launched containers for network resources.

5. The computation system of claim 4, wherein the step of monitoring the operational state of the container on the host and dynamically adjusting a part or all of network resources isolated by the container when the operational state of the container at least partially changes comprises:
   where any container stopping operation is detected on the host, releasing the network resources occupied by the container that stops, deleting the class and the queue discipline for the container that stops, and releasing the exclusive network identity assigned to the container that stops.

6. The computation system of claim 5, wherein the operation further comprises:
   receiving a request for setting some containers in the host as specific containers;
   setting the corresponding containers on the host as the specific containers in response to the request; and
   where the network resources available for allocation on the host are not sufficient to satisfy the demand of the relevant newly launched container for network resources, not adjusting the network resources allocated to the specific container, but selecting at least a part of containers that are not set as specific container and dynamically adjusting the network resources of at least a part of the containers that are selected to satisfy the demand of the relevant newly launched container for network resources.

7. A network resource isolation method for container networks, wherein the method comprises:
   before a relevant container sends out a data packet, attaching an exclusive network identity of the container to the data packet without losing source container information of the data packet in an overlay network mode;
   identifying a source container of the data packet according to the container network identity attached to the data packet in both the overlay network mode and a non-overlay network mode and classifying the data packet into a class and a queue discipline of the source container;

monitoring an operational state of the container on a host and dynamically adjusting a part or all of network resources isolated by the container when the operational state of the container at least partially changes, including:

where any newly launched container on the host is detected, assigning an exclusive network identity to each said newly launched container, creating the class and the queue discipline for each said newly launched container wherein the class and the queue discipline are used to isolate the network resources of the container, analyzing a startup parameter of each said newly launched container to convert the startup parameter into a traffic control command, and configuring the isolated network resources to the class and the queue discipline for the relevant newly launched container according to the relevant traffic control command;

managing the container network identity used by the container that is configured to network resource isolation and is active on the host;

recording a state of the relevant container network identity using a bitmap;

when the relevant newly launched container needs to apply for a container network identity, searching for a minimal available container network identity from a low-order address in the bitmap and assigning it to the relevant newly launched container; and when the active container stops, changing a state of the container network identity assigned to the container that stops to "available".

8. The method of claim 7, wherein before the relevant container sends out the data packet, attaching the exclusive container network identity of the container to the data packet without losing source container information of the data packet in the overlay network mode is achieved by attaching the exclusive container network identity of the container to a control information struct of the data packet.

\* \* \* \* \*